United States Patent [19]

Reynolds

[11] Patent Number: 4,653,279

[45] Date of Patent: Mar. 31, 1987

[54] INTEGRAL REFILMER LIP FOR FLOATWALL PANELS

[75] Inventor: Harold G. Reynolds, West Palm Beach, Fla.

[73] Assignee: United Technologies Corporation, Hartford, Conn.

[21] Appl. No.: 689,218

[22] Filed: Jan. 7, 1985

[51] Int. Cl.[4] .......................... F02C 1/00; F02G 3/00

[52] U.S. Cl. ........................................ 60/757; 60/755

[58] Field of Search ................ 60/752, 755, 756, 757, 60/758, 754, 760; 431/351, 352

[56] References Cited

U.S. PATENT DOCUMENTS 3,656,297 4/1972 Monk .................................. 60/755

4,302,941 12/1981 Du Bell .............................. 60/757

FOREIGN PATENT DOCUMENTS 2932318 2/1981 Fed. Rep. of Germany ........ 60/757

1289129 9/1972 United Kingdom ................. 60/755

*Primary Examiner*—Louis J. Casaregola

*Assistant Examiner*—Timothy S. Thorpe

*Attorney, Agent, or Firm*—Norman Friedland

[57] ABSTRACT

A refilmer for the combustion/dilution air hole of a floatwall panel of the combustor of a gas turbine engine carries a 180° lip extending in, the hot gas stream of the combustor having a projection projecting in the combustion/dilution air hole to divert a portion of the air stream to form the film on the inner surface of the segmented panel. The refilmer is formed integrally with the segmented panel and carries a shoulder bearing against the inner surface of the shell defining a spacer. Forming the combustion/dilution air hole integrally with the segmented panel allows the air hole to be located in any efficacious location for effectuating optimum combustion.

3 Claims, 2 Drawing Figures

INTEGRAL REFILMER LIP FOR FLOATWALL PANELS

The Government has the rights in this invention pursuant to Contract No. F33657-83-C-0092 awarded by the Department of the Air Force.

CROSS REFERENCE

This invention is related to the inventions disclosed in copending patent applications Ser. Nos. 689,253 and 689,220, both pending, entitled COMBUSTION LINER FOR A GAS TURBINE ENGINE and COMBUSTORS, filed by Thomas J. Madden and Robert C. Fucci, respectively on even date and both assigned to the same assignee of this application.

TECHNICAL FIELD

This invention relates to gas turbine engines and particularly to the liner of the combustor and more specifically to means for forming a film of cooling air on the inner surface of the combustion chambers adjacent the downstream side of the combustion/dilution air holes.

BACKGROUND ART

This invention is specific to a Floatwall material liner or a similar construction where an outer shell and inner segmented panels are arranged to define a combustion chamber. Such a construction is described and claimed in U.S. Pat. No. 4,302,941 entitled "Combustor Liner Construction for a Gas Turbine Engine", granted to T. L. DuBell on Dec. 1, 1981 and assigned to the same assignee as the present patent application.

The Floatwall combustor as described in U.S. Pat. No. 4,302,941, supra, includes a grommet type of refilmer and as noted, it is located at the juncture between segmented panels and extends through the outer shell. Because of fabrication techniques and the hostile environment to which the grommet is subjected and particularly because of the "floating wall" capabilities, it was desirable to fabricate the dilution/combustion air hole assemblies in this location. Typically, this location was at the bend of the liner which contributed to the complexity in making the combustion/dilution assembly. Moreover, the segmented panel is designed to float circumferentially and axially thus changing the opening into the lip and affecting the "cooling film".

DISCLOSURE OF INVENTION

An objective of this invention is to provide improved means for reapplying film cooling air along a floatwall combustor panel after it has been interrupted by combustion/dilution airflow. A feature of this invention is to incorporate the refilmer lip into the body of the combustion/dilution air hole so that it protrudes into the inner diameter and fabricate the entire assembly integrally with the panel. In this manner the refilmer lip protrudes into the combustion/dilution airstream and diverts some of the air to flow along the inner surface of the segmented panel providing film cooling downstream of the combustion/dilution hole.

Inasmuch as the combustion/dilution air holes are not restricted to the ends of adjacent panels as was the case of heretofore known designs, it is now possible to locate the combustion/dilution holes in optimum locations to achieve optimum combustion.

Because the combustion/dilution hole can be located away from the bend of the outer shell, the design of the combustion/dilution hole according to this invention can be such as to mitigate against air leakage around the joint where the cup defining the combustion/dilution air hole protrudes through the shell.

Other features and advantages will be apparent from the specification and claims and from the accompanying drawings which illustrate an embodiment of the invention.

BEST MODE FOR CARRYING OUT THE INVENTION

Figure 1:
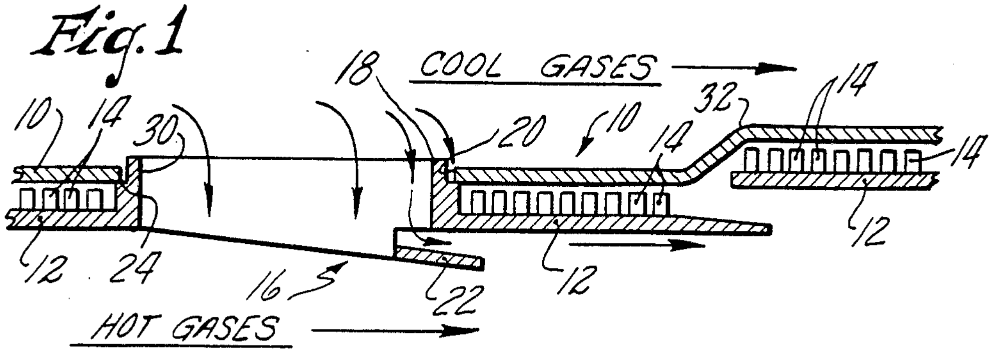
FIG. 1 is a partial view in section of a Floatwall liner of a combustor for a gas turbine engine illustrating the details of this invention.
Figure 2:
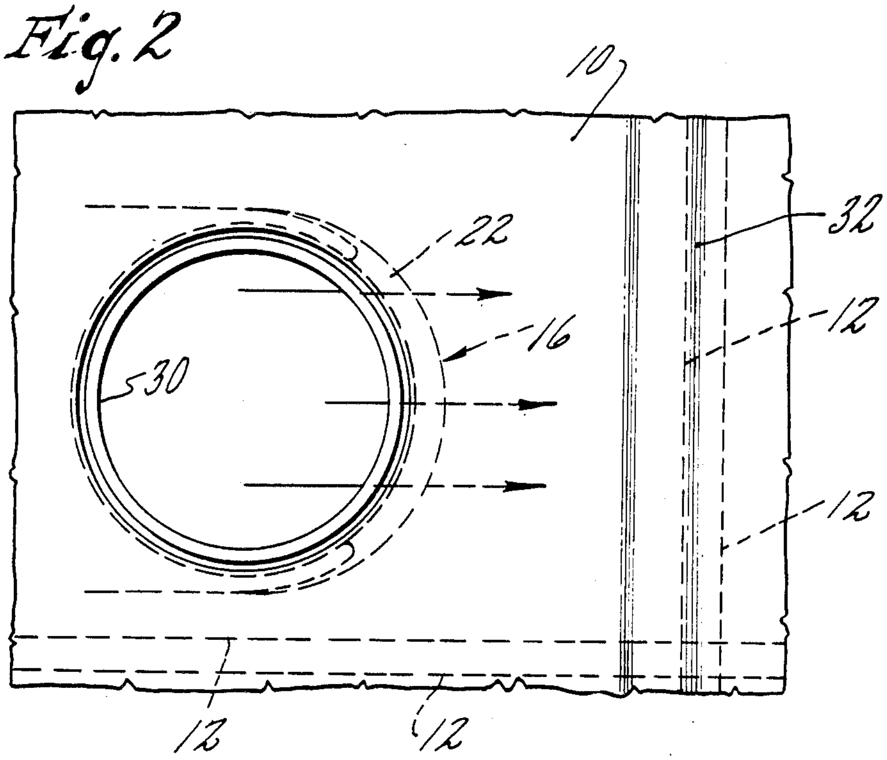
FIG. 2 is a partial top view of the embodiment shown in FIG. 1.

Referring to FIGS. 1 and 2 which partially shows a Floatwall liner for the combustion chamber for a gas turbine engine and is similar to the one embodiment described in U.S. Pat. No. 4,302,941, supra.

Essentially, the liner is comprised of an outer generally cylindrical and/or conical (or partly both) shaped one-piece outer shell generally indicated by reference numeral 10 and a plurality of segmented panels 12 that extend axially and circumferentially but radially spaced relative to the shell and being contiguous therewith. The combination comprises a double wall assembly that is suitably retained radially (not shown) where the panels are capable of moving axially and circumferentially relative to the shell and in response to the hostile environment. In the annular combustor embodiment a similar liner construction is concentrically and coaxially mounted relative to the complimentary liner and spaced to define an annular combustion zone.

As is well known, and typical with liners for combustion chambers, the liners define the combustion zone where fuel is combusted to generate the hot gaseous engine's working medium, and carry a plurality of combustion/dilution holes to achieve efficient combustion and proper temperature values. These holes are discretely spaced axially and circumferentially in the liner and admit compressor discharge air from the compressor (not shown) supplied to a cavity that surrounds the liner and bounded by the combustor case. Hence, the cooler air is admitted from the outer surface of the liner and directed to flow between the outer wall or shell 10 and the inner panels 12. For heat transfer effectiveness, the inner panels 12 may include a plurality of projections 14 extending axially and circumfentially between the shell and panels.

In accordance with this invention and as shown, the refilmer generally indicated by reference numeral 16 is formed integrally with the panel 12 and has a radially extending circular portion or cup 18 that extends through a hole 20 formed in the outer shell 10. A lip 22 is formed integral with the panel and extends axially and radially from the inner surface of panel 12. The lip 22 extends circumferentially for substantially 180° being sufficient to reform the cool film that was destroyed by the radial air flow of the combustion/dilultion air being admitted into the combustion zone.

An annular shoulder 24 is formed on the outer wall of the circular portion 18 to establish the dimension between the inner wall of the panel 12 and the impingement top surface of lip 22. The lip 22 is sized so that a portion on the inner diameter protrudes into the combustion/dilution hole 30 and a portion on the outer diameter extends to overlie a portion of the surface of the panel 12. This scoops the air from the combustion/-dilution air stream and redirects it to form a film of cool air over the inner surface of panel 12.

It is apparent from the foregoing that because the combustion/dilution air hole is integral with the liner panel 12, it need not be located at the bend 32 of the outer shell at the juncture where adjacent panels 12 would be located. This affords the advantage of locating the combustion/dilution air holes to achieve optimum combustion and provides an easier method of controlling the air leakage around the contact juncture where the outer shell 12 bears against the shoulder 24.

Moreover, the panel with the integral combustion/dilution air holes and refilmer can be cast, say by investment casting without requiring any subsequent machining operation.

It should be understood that the invention is not limited to the particular embodiments shown and described herein, but that various changes and modifications may be made without departing from the spirit and scope of this novel concept as defined by the following claims.

I claim:

1. For a liner for a combustor of a gas turbine engine having a generally cylindrically shaped shell and a plurality of spaced co-extensive panels extending circumferentially and axially relative to said shell, said shell having an outer surface being exposed to cooler air and said panels each having an inner surface being exposed to combustion gases, said shell being bent radially inwardly to define a bend and forming a reduced diameter portion, the upstream and downstream ends of adjacent axial panels mounted adjacent said bend, at least one combustion/dilution air hole formed integrally in one of said panels and having a cup portion radially extending through an opening in said shell, said cup having a lip extending radially and axially circumscribing 180° disposed adjacent said inner surface and having an inner diameter having a smaller diameter than the diameter of the combustion/dilution hole in said cup so that the inner diameter projects in the stream of the combustion/dilution air passing through said combustion/dilution air hole and diverts a portion of said dilution/combustion air to flow along said lip to form a cooling film stream directed to flow adjacent the inner surface of said panel.

2. For a liner as in claim 1 wherein each of said panels has upstream and downstream ends relative to the flow of combustion gases said combustion/dilution air hole is formed intermediate said upstream and downstream ends of said panel and axially spaced from said bend.

3. For a liner as in claim 2 wherein said cup portion includes a reduced diameter portion defining a shoulder, the opening in said shell being circular in shape said shoulder having a larger diameter than the diameter of said opening in said shell and bears on the inner surface of said shell at the juncture where said shell surrounds said opening.

* * * * *